(12) United States Patent
Hurst, Jr. et al.

(10) Patent No.: US 6,731,677 B1
(45) Date of Patent: *May 4, 2004

(54) METHOD AND APPARATUS FOR CARRYING DIGITAL DATA AS ANALOG VIDEO

(75) Inventors: Robert Norman Hurst, Jr., Hopewell, NJ (US); Raymond Lowe, North Caldwell, NJ (US)

(73) Assignee: Sarnoff Corporation, Princeton, NJ (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/518,318

(22) Filed: Mar. 3, 2000

Related U.S. Application Data

(60) Provisional application No. 60/122,817, filed on Mar. 4, 1999.

(51) Int. Cl.[7] .............................................. H04L 25/00
(52) U.S. Cl. ....................... 375/216; 348/463; 348/467; 348/473
(58) Field of Search ...................... 375/216; 348/461, 348/462, 463, 465, 467, 473, 474, 475, 476, 464, 466, 468; 386/94

(56) References Cited

U.S. PATENT DOCUMENTS

| 5,091,936 A | * | 2/1992 | Katznelson et al. | ........ 380/237 |
| 5,150,211 A | | 9/1992 | Charbonnel et al. | ......... 358/143 |
| 5,430,487 A | | 7/1995 | Naimpally | .................. 348/429 |
| 5,493,339 A | | 2/1996 | Birch et al. | .................. 348/461 |
| 5,651,065 A | | 7/1997 | Stufflet et al. | ................. 380/15 |
| 5,675,388 A | | 10/1997 | Cooper | ......................... 348/461 |
| 5,808,689 A | | 9/1998 | Small | ........................... 348/476 |

* cited by examiner

*Primary Examiner*—Don N. Vo
(74) *Attorney, Agent, or Firm*—William J. Burke

(57) ABSTRACT

An interface, e.g., a modem-like interface for converting a digital information signal into an analog signal for use within an analog television studio infrastructure. Namely, the present invention employs a novel modulator that conveys compressed video data into analog video lines by creating an analog "video" signal that contains video gray-scale levels which correspond to digital data values, instead of containing an image.

21 Claims, 4 Drawing Sheets

METHOD AND APPARATUS FOR CARRYING DIGITAL DATA AS ANALOG VIDEO

This application claims the benefit of U.S. Provisional Application No. 60/122,817 filed on Mar. 4, 1999, which is herein incorporated by reference.

This invention was made with U.S. government support under contract number NIST 70NANB5H1174. The U.S. government has certain rights in this invention.

The invention relates to communications systems generally and, more particularly, the invention relates to an apparatus and method for distributing digital information, such as MPEG-like data, over an analog system having an analog infrastructure.

BACKGROUND OF THE DISCLOSURE

Existing television studios or TV plants, by and large, use analog video signals carried over 75-ohm coax to convey signals around their plant. Each television studio has a large investment in its infrastructure such as routing "grids" which allow signal routing to be changed as needed within the plant.

With the proliferation of digital television signals, these costly existing analog infrastructures are incompatible in dealing with digital information. A small fraction of TV plants have converted over to the newer "SDI" 270 Mb/s digital system (SMPTE 259M) for conveying uncompressed digital standard definition video, and additional standards are emerging (e.g., SMPTE 305M) that define how to use this infrastructure to convey all kinds of other data, especially compressed video. The reluctance or slow pace of conversion to an all-digital infrastructure is due substantially to cost and the large investment in the analog infrastructures. As such, the majority of current TV stations still operate all-analog infrastructures. Thus, it would be very advantageous if digital information such as Advanced Television Systems Committee (ATSC) signals can be routed within the existing analog infrastructures.

Therefore, there is a need in the art for an apparatus and method for distributing digital information over an analog system having an analog infrastructure.

SUMMARY OF THE INVENTION

An embodiment of the present invention employs an interface, e.g., a modem-like interface for converting a digital information signal into an analog signal for use within an analog television studio infrastructure. Specifically, digital data is converted into a National Television Systems Committee (NTSC)-like waveform that uses the active video portion of the signal to carry the digital data. Namely, the present invention employs a novel modulator that conveys compressed video data into analog video lines by creating an analog "video" signal that contains video gray-scale levels which correspond to digital data values, instead of containing an image. The data is represented in a manner that is robust and is capable of withstanding the distortions that it may encounter on its way through various media, including frequency rolloff, phase distortion, proc amp blanking, clipping, and other video waveform distortion effects.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 2:
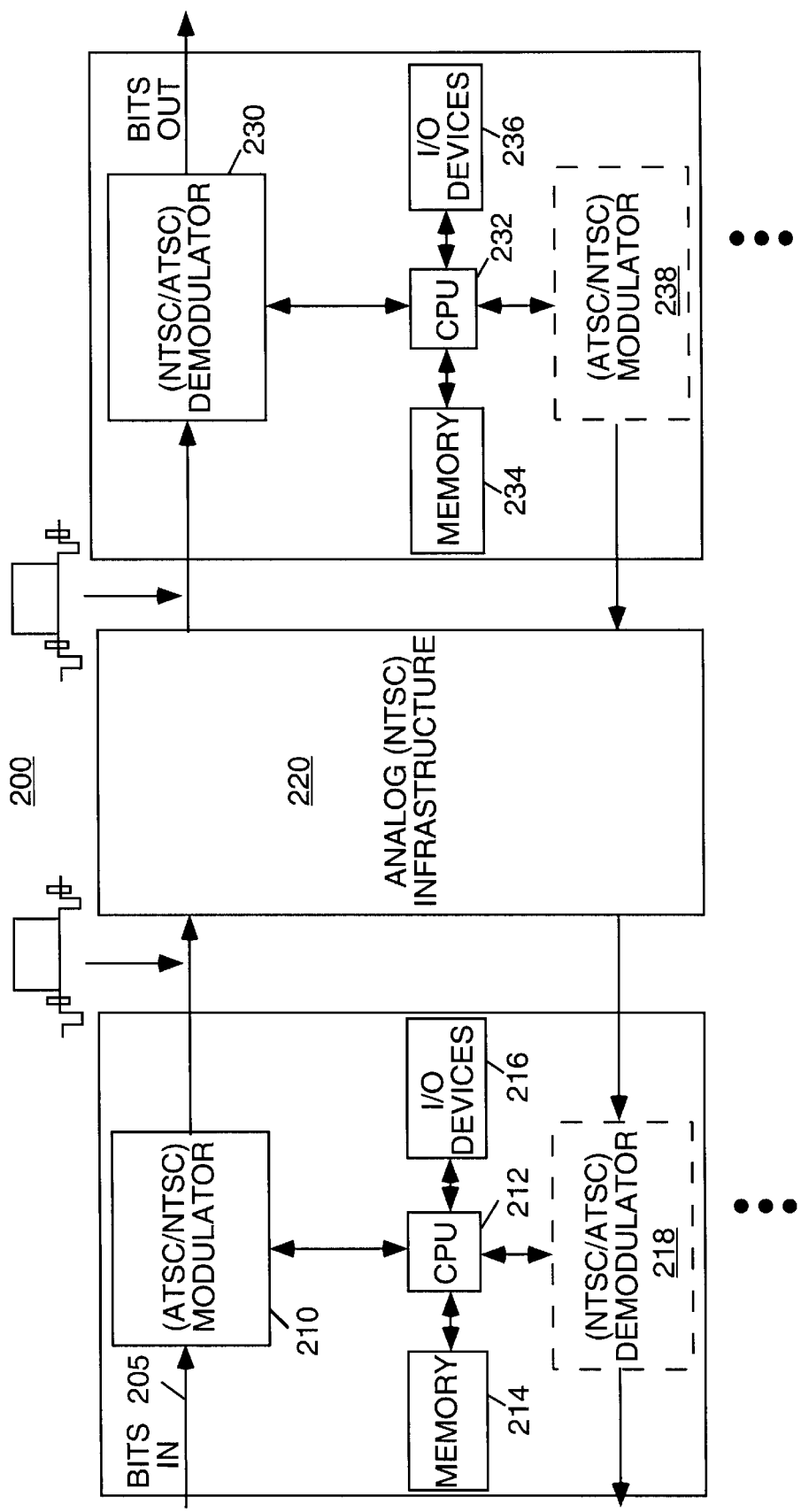
FIG. 2 depicts a block diagram of a communications system for distributing digital information over an analog infrastructure.

FIG. 2 depicts a block diagram of a communications system 200 of the present invention for distributing digital information, e.g., ATSC or other Moving Picture Experts Group (MPEG)-like data over an analog infrastructure 220. The communications system 200 comprises a modulator 210 and a demodulator 230.

It should be noted that FIG. 2 also depicts one embodiment of the present invention where the modulator 210 and demodulator 230 are implemented within general purpose computers. In such embodiment, a general purpose computer may comprise a modulator 210 (or demodulator 230), a processor (CPU) 212 (or 232), a memory 214 (or 234), e.g., random access memory (RAM), and various input/output devices 216 (or 236), (e.g., a keyboard, a mouse, an audio recorder, a camera, a camcorder, a video monitor, any number of imaging devices or storage devices, including but not limited to, a tape drive, a floppy drive, a hard disk drive or a compact disk drive).

It should be understood that the modulator 210 (or demodulator 230) can be a physical device that is coupled to the CPU through a communication channel. Alternatively, the modulator 210 (or demodulator 230) can be represented by one or more software applications (or even a combination of software and hardware, e.g., using application specific integrated circuits (ASIC)), where the software is loaded from a storage medium, (e.g., a magnetic or optical drive or diskette) and operated by the CPU in the memory of the computer. As such, the modulator and demodulator (including associated data structures) of the present invention can be stored on a computer readable medium, e.g., RAM memory, magnetic or optical drive or diskette and the like.

Specifically, in one embodiment the communications system 200 employs the modulator 210 for converting an ATSC signal into a NTSC signal, which is then stored, distributed, or routed through an existing analog NTSC infrastructure 220. When the analog NTSC signal is routed to its destination, the demodulator 230 demodulates the analog NTSC signal back into the original ATSC signal.

In operation, the digital stream on path 205 goes into the modulator 210 that creates a waveform as illustrated below in FIG. 1, and this NTSC-like signal may be carried throughout the analog NTSC infrastructure 220. At any destination point that receives the NTSC-like or NTSC-compliant signal, a demodulator 230 is employed to extract and output the original digital data.

Figure 1:
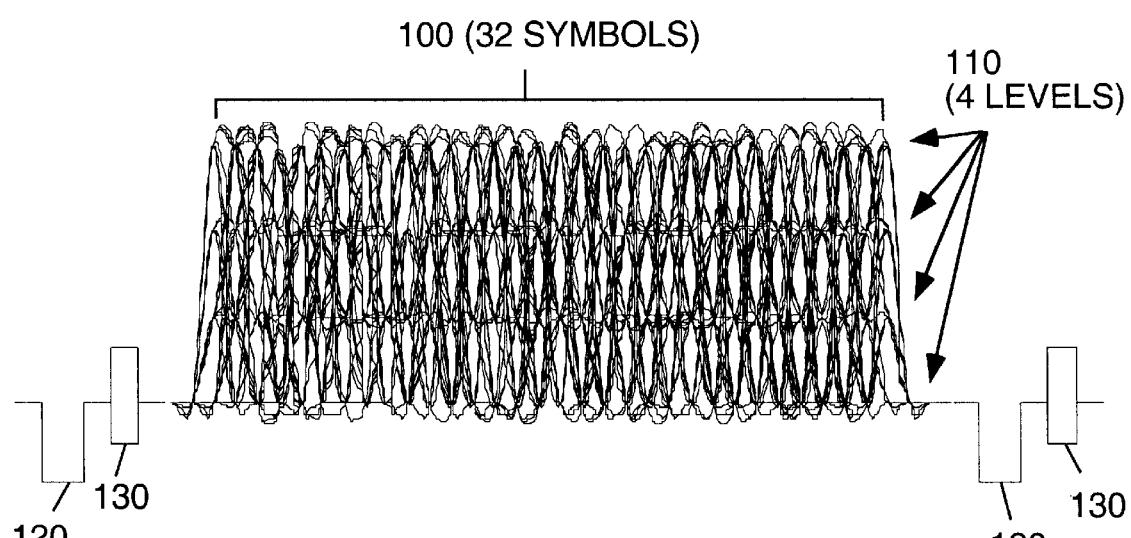
FIG. 1 depicts a graphical representation of a digital information signal being represented as an analog video signal.

To illustrate, FIG. 1 is a graphical representation of digital data (e.g., ATSC data, MPEG-like data, Digital Video Broadcasting (DVB) data, digital audio data, meta data, control data and the like) being represented by an analog video signal or, more particularly, within the "active video portion" of the video line. Namely, the "active video portion" is typically where the picture of an NTSC signal will occupy. Thus, although the analog waveform carrying the digital data is NTSC-compliant, any attempts to actually view the active video portion of this NTSC-compliant signal will likely produce an image that resembles noise. However, from the perspective of the analog infrastructure 220, such NTSC-compliant signals can be stored, distributed, or routed like any other NTSC-compliant signals that actually carry images in the active video portion of the signal. Thus, the desired result is achieved where digital data can be carried within an analog infrastructure, thereby allowing TV studios to continue use of their existing analog systems.

Specifically, FIG. 1 shows multiple lines (overlaid) each with 32 symbols 100 of four levels 110 each. It should be noted that the resulting video signal 100 carrying the digital information is preceded by a sync pulse 120 and a color subcarrier or burst (a high frequency sine wave) 130, which are NTSC timing system signals.

Namely, the example illustrates each TV line with thirty-two (32) symbols having four (4) levels for each symbol. Since four levels can be represented by two bits, each line represents 64 bits. With 483 active lines per frame and 30 frames per second, this gives 14,490 active lines per second, or 927 kbits/sec. This rate may be too low to support ATSC, but fortunately the NTSC signal can support many more symbols per line as well as more levels per symbol.

Thus, if a rate of 20 Mbits/sec is desired, then one would fit 20 Mbits/sec into 14,490 lines/sec, thereby needing to pack 1,381 bits into each line. Given a 4.2 Mhz bandwidth, one can fit 450 symbols into a 53 $\mu$Sec active line time (one symbol per half-cycle of 4.2 MHz), thereby implying 1381/450, or that slightly more than 3 bits per symbol is required.

Using 16 levels (4 bits) per symbol and choosing the NTSC subcarrier as half the symbol clock, the present apparatus will provide 379 symbols per line, thereby achieving (4 bits/symbol)*(379 symbols/line)*(14,490 lines/sec)= 21.966840 Mbits/sec. It should be noted that the foregoing is an example only, and the present invention is not so limited. In the preferred embodiment, the present apparatus should relate the symbol clock to the digital signal (e.g., NTSC) subcarrier by a factor which is the ratio of integers, e.g., 2:1 in the above case.

Choosing the NTSC subcarrier as half the symbol clock is one of the important aspects of the present invention. Namely, the color subcarrier or burst 130 can be used as a reference for the symbol clock, thereby making the present apparatus more robust. This allows the symbol clock to be quickly acquired and locked by the demodulator 230, since the color burst signal 130 is typically very stable and its relationship to the data 100 is known. This allows the demodulator 230 to quickly acquire the symbol clock and begin decoding data.

Figure 3:
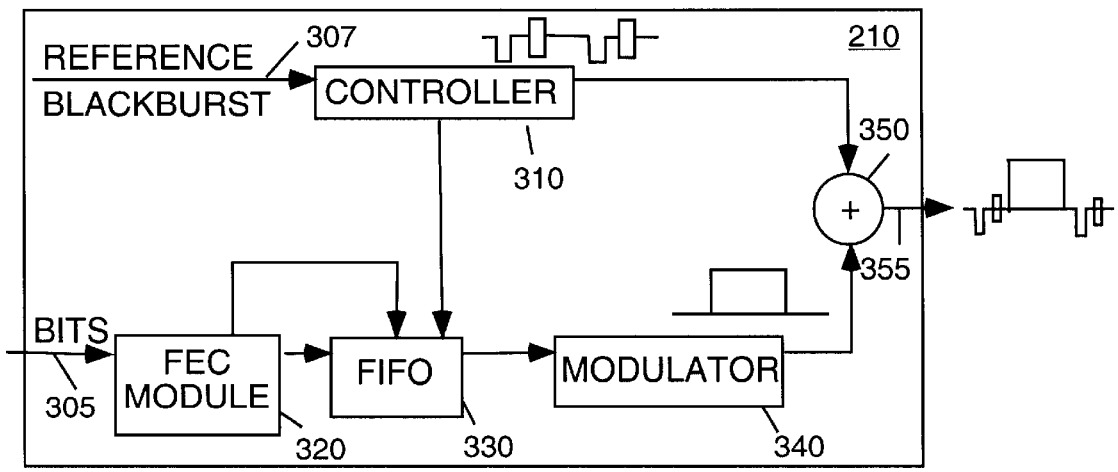
FIG. 3 depicts a block diagram of a modulator of the invention.

FIG. 3 depicts a block diagram of the modulator 210 of the present invention. The modulator 210 comprises a controller 310, a forward error correction (FEC) module 320, a buffer 330 (e.g., First-In-First-Out (FIFO)), a modulator (or mixer) 340 and an adder 350.

In operation, digital information is received into the modulator 210 on path 305. The digital information undergoes a series of processing steps within the forward error correction module 320 that is intended to allow recovery of the data signal if errors occur. For example, the forward error correction module 320 may incorporate a data randomizer, one or more encoders (e.g., Reed-Solomon encoder or Trellis encoder), and a data interleaver. The data randomizer (not shown) can be tasked with randomizing the incoming digital data payload, e.g., MPEG transport packets.

The encoders (not shown) are employed to apply one or more forward error correction processes to the incoming digital data signal. FEC processes are error correction schemes that are designed to correct bit errors that may occur during transmission, e.g., noise, multipath propagation, transmitter non-linearities, and signal fades. The present invention is not limited to a particular FEC process.

The data interleaver (not shown) is employed to scramble the sequential order of the data stream and to disperse the data packets throughout time, e.g., over a period of time such as several milliseconds. The purpose of the data interleaver is to disperse the data packets in order to minimize the transmitted signal's vulnerability to burst type interference. Namely, the data interleaver assembles tiny fragments of scrambled data packets into new data packets, where the reconstituted data packets have the same length as the original data packets. Thus, a brief noise burst will only cause the loss of some of the data in the stream for any given period of time. It should be noted that the various functions performed by the forward error correction module 320 can be implemented within the modulator 210 or outside of the modulator 210 in a pre-processing module.

Returning to FIG. 3, the "error corrected" signal from the forward error correction module 320 is stored in a buffer (FIFO) 330. The stored bitstream is then sent from the FIFO under the control of controller 310 to the modulator or mixer 340, where the digital ATSC signal is modulated into an NTSC analog signal.

It should be noted that the FIFO will periodically stop sending data to the modulator 340 under the control of the controller 310. Namely, due to the effect of horizontal and vertical blanking in an NTSC compliant signal, the modulator 340 must pause to allow the sync and burst portions of the NTSC compliant signal to be devoid of any video information. Thus, when the modulator 340 is paused, the controller will forward or supply the sync and burst portions of the NTSC compliant signal to the adder 350, thereby forming an NTSC compliant signal on path 355. As such, the controller 310 is illustrated as receiving a reference signal or a Genlock input on path 307, e.g., a black burst signal, a color burst signal, a sync signal, a subcarrier signal and the like. In fact, alternatively, the controller 310 can be implemented such that these reference signals are generated by the controller 310 itself.

Figure 4:
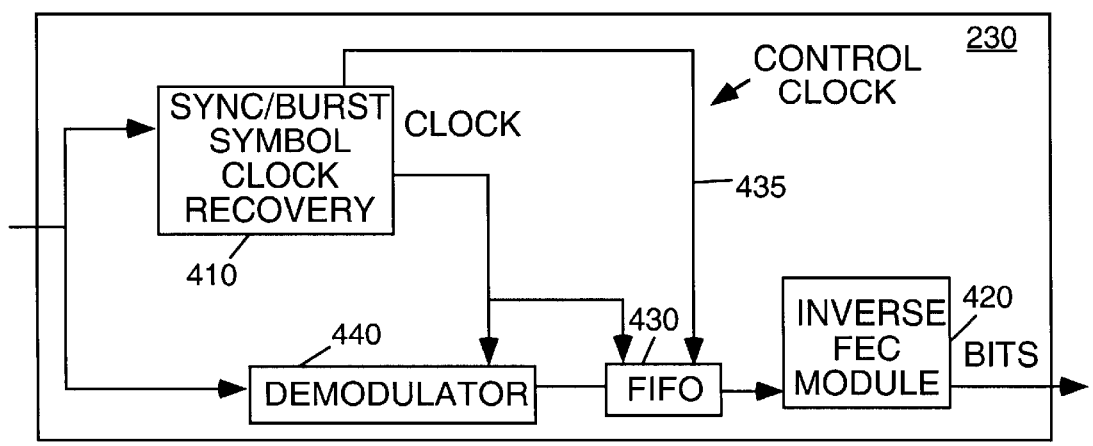
FIG. 4 depicts a block diagram of a demodulator of the invention.

FIG. 4 depicts a block diagram of the demodulator 230 of the present invention. The demodulator 230 comprises a symbol clock recovery module 410, an inverse forward error correction module 420, a buffer 430 (e.g., First-In-First-Out (FIFO)) and a demodulator (or demixer) 440. The symbol clock recovery module 410 is tasked with acquiring the timing signals, e.g., the sync and burst signals, thereby acquiring the symbol clock as discussed above due to the known relationship of the symbol clock and the burst signal. In brief, the inverse forward error correction module 420, and demodulator (or demixer) 440 are simply performing the inverse functions performed by the forward error correction module 320, and modulator (or mixer) 340. Finally, the digital information is stored in the buffer 430 and is clocked out in accordance with control signal on path 435.

Alternative embodiments of the present invention are now described below. First, it should be noted that other data modulation schemes currently in use can be adapted to the present invention. For example, Quadrature Amplitude Modulation (QAM) may be used, with a carrier frequency chosen to keep the lower end of the QAM spectrum from folding around DC. Additionally, it should be noted that either using more levels and/or more bandwidth will allow for a higher data rate.

Second, a portion of the "Analog NTSC Infrastructure" 220 of FIG. 2 may include a VTR so that the digital signal may be recorded on an analog VTR and played back through the demodulator at a later time. Thus, the data modulation scheme may be modified to allow use with certain VCRs which have reduced bandwidth. For example, some VCRs (e.g., VHS) extract some of the video spectrum as "chroma" but do not reconstruct it well enough for this purpose, so the data spectrum may be designed to avoid frequencies above 2.5 or 3.0 MHz.

Third, those skilled in the art will recognize that the present system is described with reference to NTSC video, but it can be adapted for Phase Alternation by Line (PAL) or (Sequential Technique and Memory Storage) SECAM video.

Fourth, special reference data patterns may be multiplexed along with the payload data at certain times to provide a measure of the channel quality. Furthermore, special waveforms (not just data patterns) may be sent at regular intervals to allow automatic gain control (AGC) circuitry in the processing chain to maintain appropriate gain levels for the data pattern.

Fifth, certain portions of the data stream may be reserved for special control data. These may be partitioned as just a reserved part of the regular data stream, or a certain section of the video waveform e.g., one or more lines may be reserved for this use. Furthermore, a different type of modulator (modem) scheme may be used on certain portions of the video waveform, e.g., a scheme that is more robust (lower symbol rate and/or fewer bits/symbol) to allow communication and control even in cases where the channel quality is too poor to convey the higher-speed data. For example, a two-way architecture may be devised using two (2) modulator/demodulator pairs and a pair of video connections (e.g., an optional pair of modulator/demodulator 218 and 238 is shown in FIG. 2 in dashed boxes). This allows for the modulators to "communicate with each other" and determine, among other things, the quality of the channel, or to convey control data and to verify that the connections are made even though the high-speed data may not be decodable. This would allow for instance debugging of a poor connection.

Sixth, as indicated above, it is possible to lock the symbol clock to the subcarrier frequency by the ratio of two integers. The leading edge of the horizontal sync could additionally provide phasing information to indicate the location of the first symbol, but due to the practice of replacing sync and burst signals along the processing chain, this relationship may be lost, so this technique may not be appropriate in some applications. However, the color burst signal is well-known to be a very clean and stable frequency reference, and so that it can be employed as a symbol clock frequency reference, but not as a symbol phase reference, which may be extracted from the symbol waveform itself by techniques well know to those skilled in the art of digital modem design. Another alternate solution, well-known to modem designers, is to directly extract both the clock frequency and symbol phase information from the symbol waveform itself, without reference to the sync or subcarrier in the video waveform.

Figure 5:
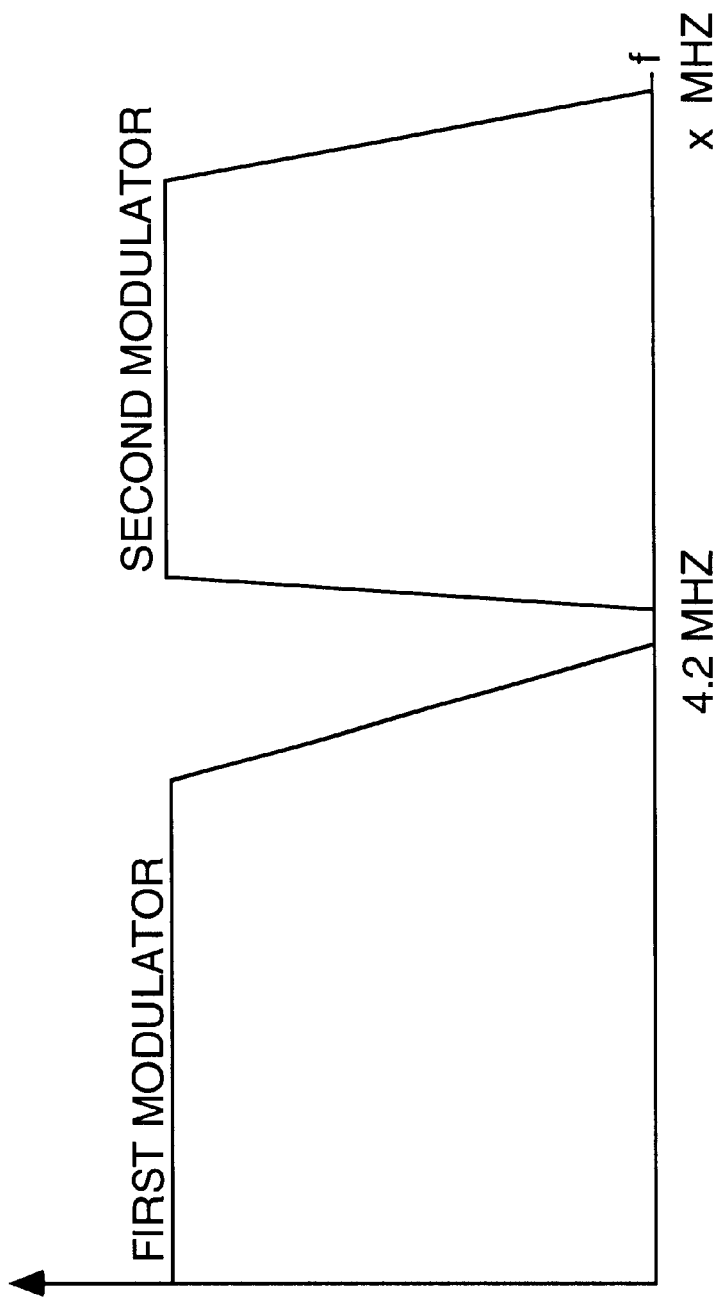
FIG. 5 depicts a graphical representation of modulation spectra corresponding to multiple modulations.

Seventh, broadcast systems typically have higher bandwidth than the NTSC channel of 4.2 Mhz, and more symbols per line may be used to convey more data. However, this additional bandwidth may be used by creating a second modulation spectrum and frequency-shifting it up above the first modulation spectrum. This additional channel may be used to carry any types of data, but since it may be less robust than the first modulation spectrum, it might be used to carry augmentation data instead. FIG. 5 shows this frequency split as appearing at 4.2 Mhz, but another split point may be used as well, e.g., where "x" is 7 Mhz.

Although various embodiments which incorporate the teachings of the present invention have been shown and described in detail herein, those skilled in the art can readily devise many other varied embodiments that still incorporate these teachings.

What is claimed is:

1. A method for converting an input digital signal into a format that allows the input digital signal to be carried over an analog system having an analog infrastructure, said method comprising the steps of:
   (a) acquiring the input digital signal, wherein said input digital signal represents compressed digital video data; and
   (b) modulating the input digital signal into an active video portion of an analog signal, wherein said active video portion of said analog signal only carries said modulated input digital signal.

2. The method of claim 1, further comprising the step of:
   (c) distributing said analog signal over the analog infrastructure.

3. The method of claim 1, wherein said analog signal is a television signal.

4. The method of claim 3, wherein said analog signal is a National Television Systems Committee (NTSC) compliant signal.

5. The method of claim 3, wherein said analog signal is a Phase Alternation by Line (PAL) compliant signal.

6. The method of claim 3, wherein said analog signal is a (Sequential Technique and Memory Storage) SECAM compliant signal.

7. The method of claim 1, wherein said input digital signal is an Advanced Television Systems Committee (ATSC) compliant signal.

8. The method of claim 1, wherein said input digital signal is a Digital Video Broadcasting (DVB) compliant signal.

9. The method of claim 1, wherein said modulating step (b) comprises the steps of:
   (b1) organizing the input digital signal into a plurality of symbols; and
   (b2) modulating said plurality of symbols into said analog signal in accordance with a symbol clock that is related to a reference signal of said analog signal.

10. The method of claim 9, wherein said reference signal of said analog signal is a color burst signal.

11. The method of claim 9, wherein said modulating step (b) further comprises the step of:
    (b3) pausing said modulating step (b2) of said plurality of symbols while said reference signal is being generated as a portion of said analog signal.

12. The method of claim 1, wherein said modulating step (b) modulates the input digital signal using Quadrature Amplitude Modulation (QAM).

13. The method of claim 1, wherein said input digital data selectively comprises reference data for measuring channel quality.

14. A method for extracting an input digital signal from an analog signal received over an analog system having an analog infrastructure, said method comprising the steps of:

(a) acquiring the analog signal; and (b) demodulating an active video portion of said analog signal to extract the input digital signal, wherein said input digital signal represents compressed digital video data, wherein said active video portion of said analog signal only carries said modulated input digital signal.

15. The method of claim 14, wherein said analog signal is a television signal.

16. An apparatus for converting an input digital signal into a format that allows the input digital signal to be carried over an analog system having an analog infrastructure, said apparatus comprising:

a buffer for storing the input digital signal, wherein said input digital signal represents compressed digital video data; and a modulator, coupled to said buffer, for modulating the input digital signal into an active video portion of an analog signal, wherein said active video portion of said analog signal only carries said modulated input digital signal.

17. The apparatus of claim 16, wherein said modulator organizes the input digital signal into a plurality of symbols and modulates said plurality of symbols into said analog signal in accordance with a symbol clock that is related to a reference signal of said analog signal.

18. The apparatus of claim 17, further comprising:

a controller, coupled to said buffer, for controlling said buffer to pause the forwarding of said plurality of symbols to said modulator, while said reference signal is being generated as a portion of said analog signal.

19. An apparatus for extracting an input digital signal from an analog signal received over an analog system having an analog infrastructure, said apparatus comprising:

a demodulator for demodulating an active video portion of said analog signal to extract the input digital signal, wherein said input digital signal represents compressed digital video data, wherein said active video portion of said analog signal only carries said modulated input digital signal; and a buffer, coupled to said demodulator, for storing the input digital signal.

20. A computer-readable medium having stores thereon a plurality of instructions, the plurality of instructions including instructions which, when executed by a processor, cause the processor to perform the steps comprising of:

(a) acquiring the input digital signal, wherein said input digital signal represents compressed digital video data; and (b) modulating the input digital signal into an active video portion of an analog signal, wherein said active video portion of said analog signal only carries said modulated input digital signal.

21. A computer-readable medium having stored thereon a plurality of instructions, the plurality of instructions including instructions which, when executed by a processor, cause the processor to perform the steps comprising of:

(a) acquiring the analog signal; and (b) demodulating an active video portion of said analog signal to extract the input digital signal, wherein said input digital signal represents compressed digital video data, wherein said active video portion of said analog signal only carries said modulated input digital signal.

* * * * *